United States Patent
Chen et al.

(10) Patent No.: US 8,169,585 B2
(45) Date of Patent: May 1, 2012

(54) LIQUID CRYSTAL PANEL HAVING PHOTO SPACERS FOR UNIMPEDED DISPLAY

(75) Inventors: Hsi-Chien Chen, Miao-Li (TW);
Hung-Sheng Cho, Miao-Li (TW);
Kun-Hsing Hsiao, Miao-Li (TW)

(73) Assignee: Chimei Innolux Corporation, Miaoli County (TW)

( * ) Notice: Subject to any disclaimer, the term of this patent is extended or adjusted under 35 U.S.C. 154(b) by 1159 days.

(21) Appl. No.: 12/005,802

(22) Filed: Dec. 27, 2007

(65) Prior Publication Data
US 2008/0157104 A1 Jul. 3, 2008

(30) Foreign Application Priority Data
Dec. 29, 2006 (TW) .............................. 95149684 A

(51) Int. Cl.
*G02F 1/1339* (2006.01)
(52) U.S. Cl. ....................................... 349/156
(58) Field of Classification Search .................. None
See application file for complete search history.

(56) References Cited

U.S. PATENT DOCUMENTS

| | | | |
|---|---|---|---|
| 7,492,436 B2 | 2/2009 | Lim | |
| 7,576,826 B2 | 8/2009 | Kim et al. | |
| 2003/0214623 A1 | 11/2003 | Ebisu et al. | |
| 2005/0190338 A1 | 9/2005 | Lim | |
| 2006/0126003 A1* | 6/2006 | Yoo et al. ................ | 349/192 |

FOREIGN PATENT DOCUMENTS

| | | |
|---|---|---|
| CN | 1661424 A | 8/2005 |
| CN | 1661426 A | 8/2005 |
| JP | 6175133 A | 6/1994 |
| JP | 9-73088 A | 3/1997 |
| TW | 200525248 A | 8/2005 |

* cited by examiner

*Primary Examiner* — Timothy L Rude
(74) *Attorney, Agent, or Firm* — WPAT., P.C.; Justin King

(57) ABSTRACT

An exemplary liquid crystal panel (3) includes a first substrate (31), a second substrate (32) parallel to the first substrate, and a liquid crystal layer (33) sandwiched between the first and second substrates. The first substrate includes first photo spacers (37) and a first alignment film (301) formed on the first photo spacers. The second substrate includes a light-shield film (36), second photo spacers (38) formed above the light-shield film, and a second alignment film (302) formed on the second photo spacers. The first and the second photo spacers are covered by the light-shield film, and alignment defect areas of the first alignment film and the second alignment film are also covered by the light-shield film.

17 Claims, 4 Drawing Sheets

LIQUID CRYSTAL PANEL HAVING PHOTO SPACERS FOR UNIMPEDED DISPLAY

FIELD OF THE INVENTION

The present invention relates to liquid crystal panels typically used in liquid crystal displays (LCDs); and more particularly to a liquid crystal panel with photo spacers between substrates thereof, the photo spacers having different heights.

GENERAL BACKGROUND

A typical liquid crystal display (LCD) is capable of displaying a clear and sharp image through thousands or even millions of pixels that make up the complete image. The liquid crystal display has thus been applied to various electronic equipment in which messages or pictures need to be displayed, such as mobile phones and notebook computers. A liquid crystal display generally includes a liquid crystal panel for displaying images.

In a TFT-LCD (thin film transistor liquid crystal display) device, spacers are provided between two substrates of the TFT-LCD device to maintain a cell gap between the substrates. The spacers may be plastic beads, glass beads, or fiberglass beads. During manufacturing of the TFT-LCD device, in general, the spacers are first distributed onto one of the substrates. The method of distribution may, for example, be a spraying method. Once the TFT-LCD device has been assembled, the spacers keep the cell gap consistent, in order that the TFT-LCD device can work accurately and reliably. However, many or most of the spacers are located in a display region of the TFT-LCD device. These spacers may cause light scattering, which is liable to generate white point defects. Thus, the contrast and the display performance of the TFT-LCD device are impaired. For this reason, photo spacers formed by a photolithographic process have been developed to replace conventional plastic beads, glass beads, or fiberglass beads. Various dimensions and positions of the photo spacers can be provided in order to avoid affecting the transmission of light, while at the same time ensuring a uniform cell gap. Thus, the display performance of the TFT-LCD device is enhanced.

Referring to FIG. 5, a typical liquid crystal panel 2 includes a first substrate 21, a second substrate 22 parallel to the first substrate 21, and a liquid crystal layer 23 sandwiched between the first substrate 21 and the second substrate 22.

The first substrate 21 includes a plurality of parallel scanning lines (not shown), a plurality of parallel data lines (not shown) perpendicular to the scanning lines, a plurality of thin film transistors (TFTs) 29 provided in the vicinity of points of intersection of the scanning lines and the data lines, and a first alignment film 201. Each of the TFTs 29 includes a gate electrode 291, a source electrode 292, and a drain electrode 293.

The second substrate 22 includes a light-shield film 26 configured for shielding light rays, a plurality of color filters 25, a common electrode layer 24, a plurality of first photo spacers 27, a plurality of second photo spacers 28, and a second alignment film 202.

Referring also to FIG. 6, the light-shield film 26 is disposed at an inner surface of a base substrate (not labeled) of the second substrate 22. The light-shield film 26 is generally formed like a grid, thereby defining a plurality of display regions arranged in a regular array. The color filters 25 are formed at the display regions respectively. The common electrode layer 24 is formed on the light-shield film 26 and the color filters 25. The first photo spacers 27 and the second photo spacers 28 are disposed on the common electrode layer 24. Each of the first photo spacers 27 corresponds to one of the drain electrodes 293 of the first substrate 21. Each of the second photo spacers 28 corresponds to one of the source electrodes 292 of the first substrate 21. The second alignment film 202 is formed on the common electrode layer 24, the first photo spacers 27, and the second photo spacers 28. An alignment direction of the second alignment film 202 is perpendicular to an alignment direction of the first alignment film 201. The gate lines, the data lines, and the TFTs 29 of the first substrate 21 are located corresponding to the light-shield film 26.

The common electrode layer 24 is a transparent layer made from indium tin oxide (ITO) or indium zinc oxide (IZO). The first and second photo spacers 27, 28 are made from macromolecular material, and have different heights. In particular, a height of the second photo spacers 28 is slightly greater than a height of the first photo spacers 27. The heights of the first and second photo spacers 27, 28 can be reduced when the first and second photo spacers 27, 28 are forcibly compressed. The second photo spacers 28 are configured for maintaining a cell gap between the first substrate 21 and the second substrate 22. The first photo spacers 27 are configured for supporting the cell gap in case the second photo spacers 28 are pressed excessively.

During the fabrication of the first alignment film 201 and the second alignment film 202, a rubbing process is generally adopted. A brush is generally used to brush along the predetermined alignment directions of the first alignment film 201 and the second alignment film 202. However, because the first photo spacers 27 and the second photo spacers 28 have certain heights and are all arranged on the second substrate 28, alignment defects may occur when the second alignment film 202 is rubbed in areas adjacent to the first photo spacers 27 and the second photo spacers 28.

Referring to FIG. 7, an enlarged view of part of the second substrate 22 is shown. The alignment direction of the second substrate 22 is along the direction of the arrow "R". When the first and second alignment films 201, 202 are brushed during an alignment process, some small areas of the first and second alignment films 201, 202 adjacent to the first and second photo spacers 27, 28 are blocked from brushing by the first and second photo spacers 27, 28. Thus, small areas adjacent to the first photo spacers 27 along the direction R (shown in dashed lines) are alignment defect areas, and small areas adjacent to the second photo spacers 28 along the direction R are also alignment defect areas. The alignment defect areas and the display regions (i.e. the color filters 25) define overlapping areas 203. At these overlapping areas 203, liquid crystal molecules of the liquid crystal layer 23 are liable to be misaligned. Accordingly, the image quality of the display regions is reduced. Therefore, a liquid crystal display utilizing the liquid crystal panel 2 has impaired performance.

What is needed, therefore, is a liquid crystal panel that can overcome the above-described deficiencies.

SUMMARY

An exemplary liquid crystal panel includes a first substrate, a second substrate parallel to the first substrate, and a liquid crystal layer sandwiched between the first and second substrates. The first substrate includes first photo spacers and a first alignment film formed on the first photo spacers. The second substrate includes a light-shield film, second photo spacers formed above the light-shield film, and a second alignment film formed on the second photo spacers. The first and the second photo spacers are covered by the light-shield film, and alignment defect areas of the first alignment film and the second alignment film are also covered by the light-shield film.

Other novel features and advantages will become more apparent from the following detailed description when taken in conjunction with the accompanying drawings. In the drawings, all the views are schematic.

DETAILED DESCRIPTION OF PREFERRED EMBODIMENTS

Figure 1:
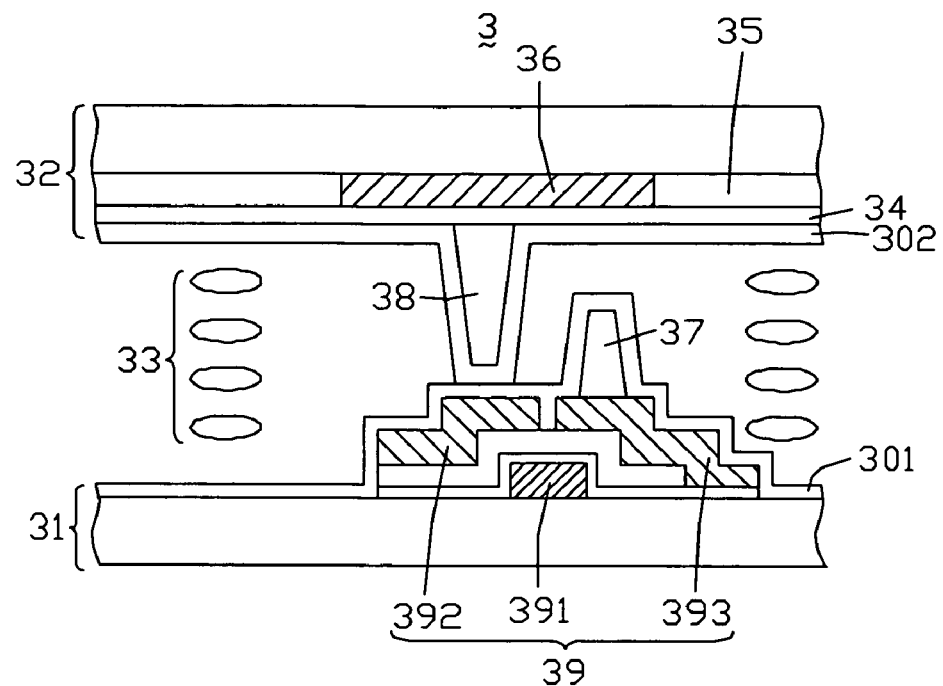
FIG. 1 is an enlarged, side cross-sectional view of part of a liquid crystal panel according to an exemplary embodiment of the present invention, the liquid crystal display including a first substrate and a second substrate.

Referring to FIG. 1, part of a liquid crystal panel 3 according to an exemplary embodiment of the present invention is shown. The liquid crystal panel 3 includes a first substrate 31, a second substrate 32 parallel to the first substrate 31, and a liquid crystal layer 33 sandwiched between the first and second substrates 31, 32.

The first substrate 31 includes a plurality of gate lines (not labeled) that are parallel to each other, a plurality of data lines (not labeled) that are parallel to each other and perpendicular to the gate lines, a plurality of TFTs 39, a plurality of first photo spacers 37, and a first alignment film 301. The gate lines intersect with the gate lines, and are insulated from the gate lines. The TFTs 39 are arranged at the vicinity of points of intersection of the gate lines and the data lines. Each of the TFTs 39 includes a gate electrode 391 connected to the corresponding gate line, a source electrode 392 connected to the corresponding data line, and a drain electrode 393. The first photo spacers 37 are formed on the TFTs 39, and correspond to the drain electrodes 393 of the TFTs 39. The first alignment film 301 is formed on the first photo spacers 37, the TFTs 39, and a base substrate (not labeled) of the first substrate 31.

Figure 2:
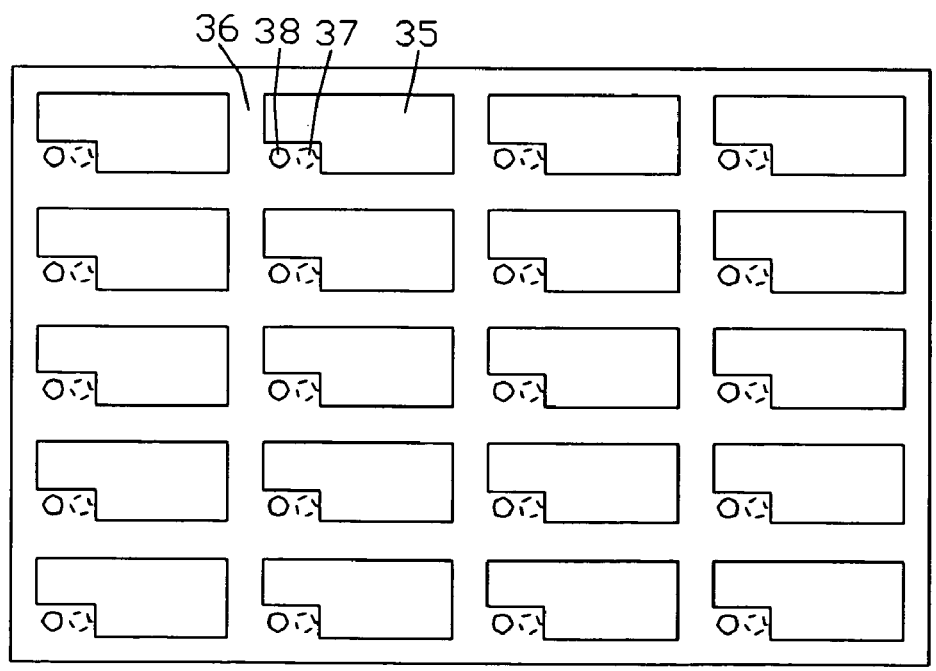
FIG. 2 is a top plan view of certain parts of the second substrate of FIG. 1.

Referring also to FIG. 2, the second substrate 32 includes a light-shield film 36, a plurality of color filters 35, a common electrode layer 34, a plurality of second photo spacers 38, and a second alignment film 302. The light-shield film 36 is formed like a grid, thereby defining a plurality of display areas arranged in a regular array. The color filters 35 are arranged at the display areas respectively. The common electrode layer 34 is formed on the light-shield film 36 and the color filters 35. The second photo spacers 38 are disposed on the common electrode layer 34. The second alignment film 302 is formed on the common electrode layer 34 and the second photo spacers 38. An alignment direction of the second alignment film 302 is perpendicular to an alignment direction of the first alignment film 301. The second photo spacers 38 correspond to the source electrodes 392 of the TFTs 39 respectively. The gate lines, the data lines, and the TFTs 39 are arranged corresponding to the light-shield film 36. The drain electrodes 393 are connected to the display areas respectively.

The common electrode layer 34 is a transparent layer made from indium tin oxide (ITO) or indium zinc oxide (IZO). The first and second photo spacers 37, 38 are made from transparent macromolecular material, and have different heights. In particular, a height of the second photo spacers 38 is slightly greater than a height of the first photo spacers 37. The first and second photo spacers 37, 38 are elastically deformable when forcibly compressed. The second photo spacers 38 are configured for maintaining a cell gap between the first substrate 31 and the second substrate 32. The first photo spacers 37 are configured for supporting the cell gap in case that the second photo spacers 38 are pressed excessively. The light-shield film 36 is also referred to as a black matrix, and is made from material that can shield light.

Figure 3:
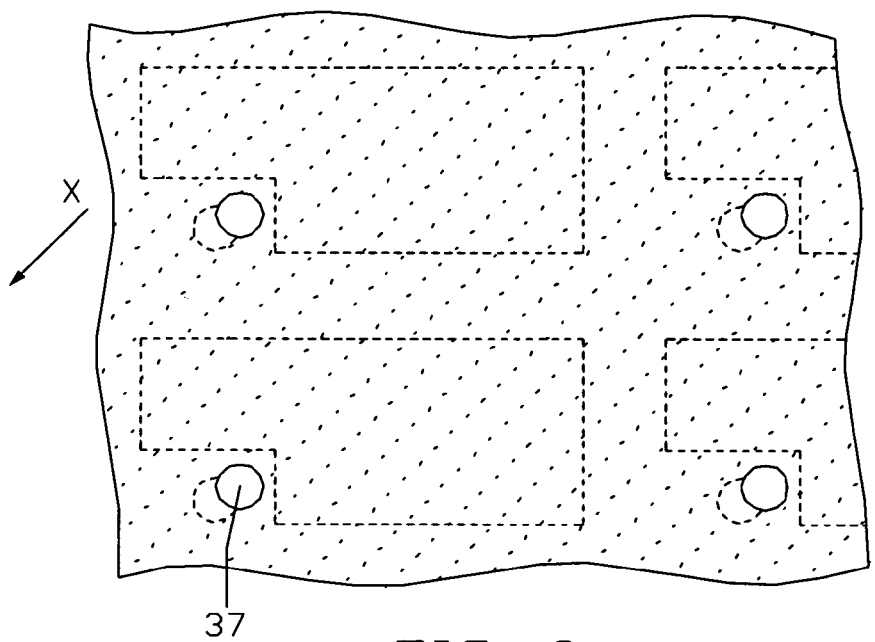
FIG. 3 is an enlarged, top plan view of certain parts of part of the first substrate of FIG. 1.

Referring also to FIG. 3, the first alignment film 301 has an alignment direction along the direction of the arrow "X". During fabrication of the first alignment film 301, the finish of an alignment process involves applying a brush to directly brush on a preform of the first alignment film 301. Because the first photo spacers 37 each have a certain height, they block the brushing operation when the preform is brushed. Small areas adjacent to the first photo spacers 37 along the direction "X" (shown with dashed lines) are inadequately brushed, and these areas are defined as first alignment defect areas. As shown, the alignment direction "X" of the first alignment film 301 is oriented 45 degrees relative to sides of the first substrate 31, and extends from the upper right corner to the lower left corner of FIG. 3. That is, the alignment direction of the first alignment film 301 is generally from where spaces between the first photo spacers 37 and the display areas are small to where the spaces between the first photo spacers 37 and the display areas are relatively greater. Therefore the first alignment defect areas are covered by the light-shield film 36 of the second substrate 32.

Figure 4:
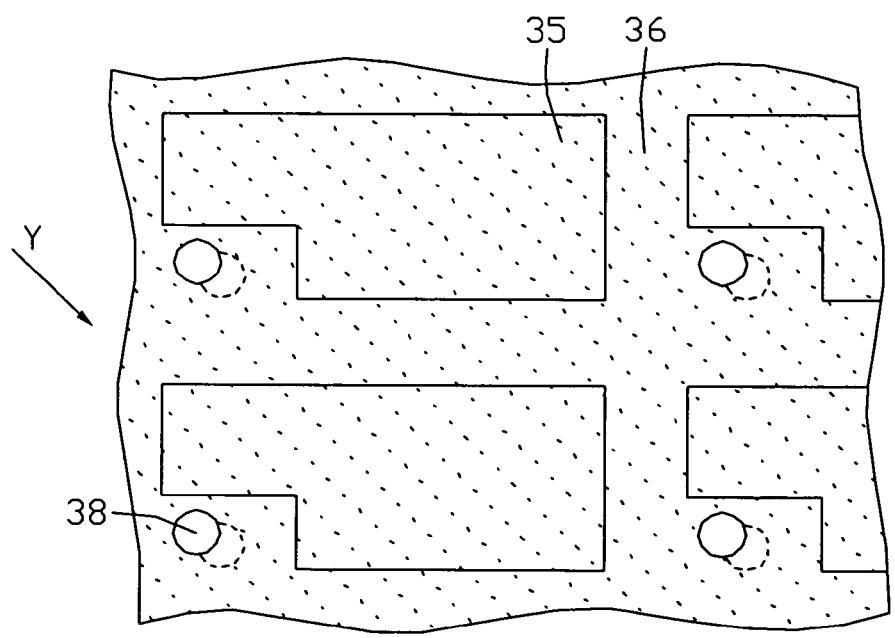
FIG. 4 is an enlarged view of part of the second substrate shown in FIG. 2.
Figure 5:
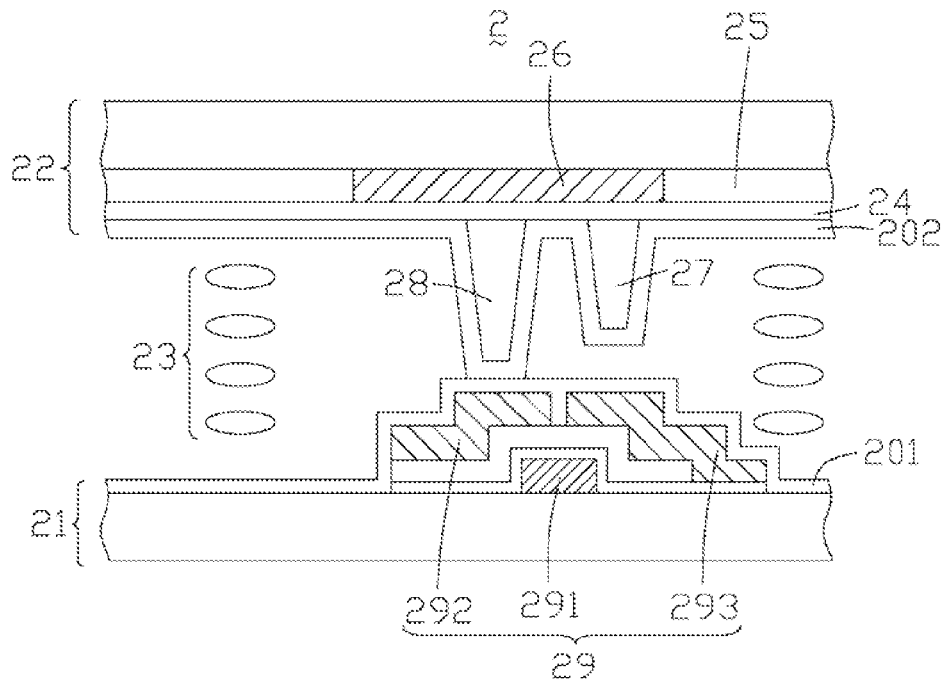
FIG. 5 is an enlarged, side cross-sectional view of part of a conventional liquid crystal panel, the liquid crystal panel including a second substrate.
Figure 6:
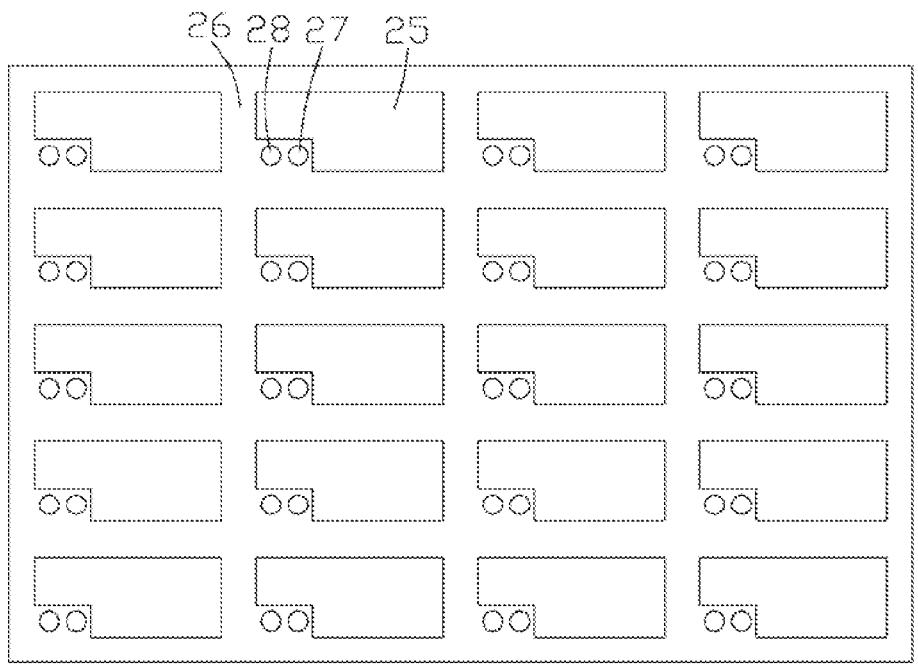
FIG. 6 is a top plan view of certain parts of the second substrate of FIG. 5.
Figure 7:
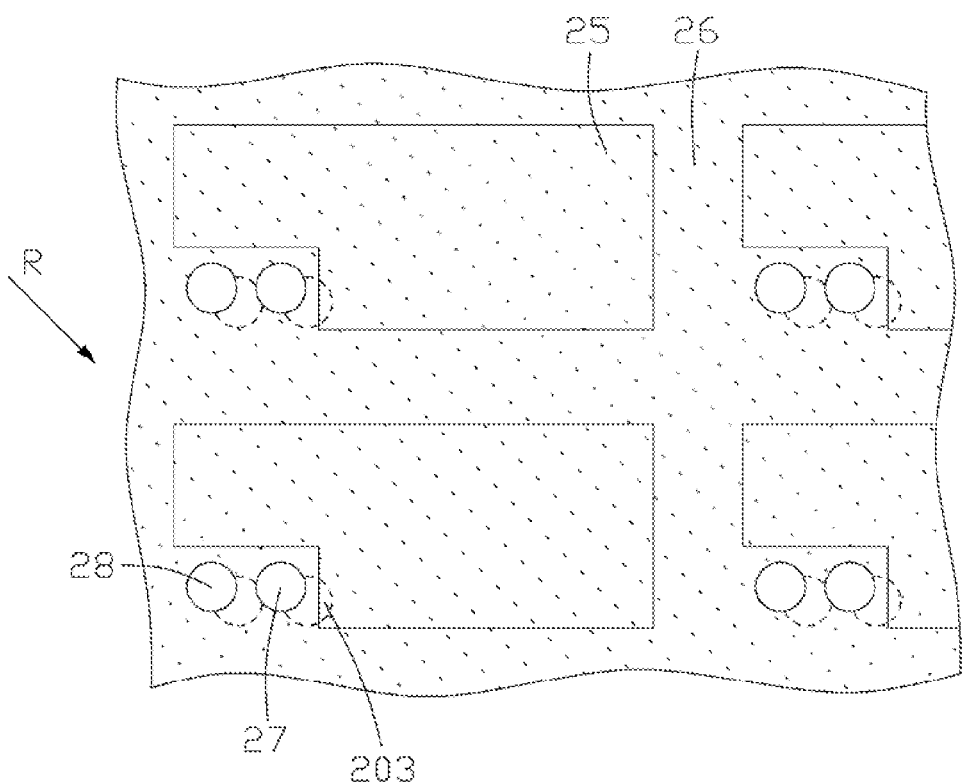
FIG. 7 is an enlarged view of part of the second substrate shown in FIG. 6.

Referring also to FIG. 4, the second alignment film 302 has an alignment direction along the direction of the arrow "Y". During fabrication of the second alignment film 302, the finish of an alignment process involves applying a brush to directly brush on a preform of the second alignment film 302. Because the second photo spacers 38 each have a certain height, they block the brushing operation when the preform is brushed. Small areas adjacent to the second photo spacers 38 along the direction "Y" (shown with dashed lines) are inadequately brushed, and these areas are defined as second alignment defect areas. As shown, the alignment direction "Y" of the second alignment film 302 is oriented 45 degrees relative to sides of the second substrate 32, and extends from the upper left corner to the lower right corner of FIG. 4. That is, the alignment direction of the second alignment film 302 is generally from where spaces between the second photo spacers 38 and the display areas are small to where the spaces between the second photo spacers 38 and the display areas are relatively greater. Therefore, similar to the first alignment defect areas, the second alignment defect areas are also covered by the light-shield film 36 of the second substrate 32. Thus, the first alignment defect areas and the second alignment defect areas are all covered by the light-shield film 36. Even if liquid crystal molecules of the liquid crystal layer 33 are misaligned at the first and second alignment defect areas, the corresponding display areas remain unaffected by liquid crystal molecule misalignment. That is, the display areas continue to function normally and provide unimpaired display quality. Accordingly, a liquid crystal display utilizing the liquid crystal panel 3 can provide good display performance.

Further or alternative embodiments may include the following. In one example, each of the first photo spacers 37 can correspond to the source electrode 392 of the corresponding TFT 39, and each of the second photo spacers 38 can correspond to the drain electrode 393 of the corresponding TFT 39. In another example, the height of the first photo spacers 37 can be greater than the height of the second photo spacers 38. With such configuration, the first photo spacers 37 are used to maintain the cell gap of the liquid crystal panel 3, and the second photo spacers 38 are used to support the cell gap in case the first photo spacers 37 are pressed excessively. Furthermore, the first and second photo spacers 37, 38 can be located at any suitable positions covered by the light-shield film 36, as long as the first and the second defect areas are covered by the light-shield film 36.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal panel comprising:
   a first substrate comprising a plurality of thin film transistors, a plurality of pixel electrodes, a plurality of first photo spacers, and a first alignment film formed on the first photo spacers and the plurality of thin film transistors, each first photo spacer being formed on a corresponding thin film transistor and corresponding to a drain electrode of the corresponding thin film transistor, the drain electrodes of the thin film transistors being connected to the corresponding pixel electrodes, each thin film transistor and the corresponding, pixel electrode connected to the thin film transistor defining a substantially rectangular pixel unit, and each thin film transistor being located at a first corner of a corresponding pixel unit;
   a second substrate parallel to the first substrate, the second substrate comprising a light-shield film, a plurality of second photo spacers corresponding to source electrodes of the plurality of thin film transistors, and a second alignment film formed on the second photo spacers, the second photo spacers being disposed between the light-shield film and the second alignment film; and
   a liquid crystal layer sandwiched between the first substrate and the second substrate;
   wherein the thin film transistors and the first and second photo spacers are covered by the light-shield film and do not overlap the plurality of pixel electrodes, the first alignment film has a first alignment direction extending from a second corner to the first corner of the pixel unit, and defines a plurality of first alignment defect areas adjacent to the first photo spacers along the first alignment direction, the first corner and the second corner are two diagonally opposite corners of the pixel unit, the second alignment film has a second alignment direction being perpendicular to the first alignment direction, and defines a plurality of second alignment defect areas adjacent to the second photo spacers along the second alignment direction, and the first and second alignment defect areas are covered by the light-shield film.

2. The liquid crystal panel as claimed in claim 1, wherein the light-shield film is grid-shaped, thereby defining a plurality of display areas corresponding to the plurality of pixel electrodes.

3. The liquid crystal panel as claimed in claim 2, wherein a height of the second photo spacers is greater than a height of the first photo spacers and is equal to a distance between the first substrate and the second substrate.

4. The liquid crystal panel as claimed in claim 2, wherein a height of the first photo spacers is greater than a height of the second photo spacers and is equal to a distance between the first substrate and the second substrate.

5. The liquid crystal panel as claimed in claim 2, wherein the first substrate further comprises a plurality of gate lines parallel to each other, and a plurality of data lines parallel to each other, the data lines intersecting with the gate lines and being insulated from the gate lines, the plurality of thin film transistors provided in the vicinity of points of intersection of the gate lines and the data lines, the data lines and the gate lines corresponding to the light-shield film.

6. The liquid crystal panel as claimed in claim 5, wherein each thin film transistor comprises a gate electrode connected to a corresponding one of the gate lines, with the source electrode of the thin film transistor connected to a corresponding one of the data lines.

7. The liquid crystal panel as claimed in claim 6, wherein the second substrate further comprises a plurality of color filters and a common electrode layer, the color filters being arranged in the display areas respectively, the common electrode layer being formed on the light-shield film and the color filters, the second photo spacers being disposed on the common electrode layer, and the second alignment film being formed on the common electrode layer and the second photo spacers.

8. A liquid crystal panel comprising
   a first substrate comprising a plurality of thin film transistors, a plurality of pixel electrodes, a plurality of first photo spacers, and a first alignment film formed on the first photo spacers and the plurality of thin film transistors, each first photo spacer being formed on a corresponding thin film transistor and corresponding to a drain electrode of the corresponding thin film transistor, the drain electrodes of the thin film transistors being connected to the corresponding pixel electrodes, each thin film transistor and the corresponding pixel electrode connected to the thin film transistor defining a substantially rectangular pixel unit, each thin film transistor being located at a first corner of a corresponding pixel unit;
   a second substrate comprising a plurality of second photo spacers corresponding to source electrodes of the plurality of thin film transistors and a second alignment film formed on the second photo spacers; and
   a light-shield film formed in a grid on one of the first substrate and the second substrate;
   wherein the thin film transistors and the first and second photo spacers are covered by the light-shield film and do not overlap the plurality of pixel electrodes, the first alignment film has a first alignment direction extending from a second corner to the first corner of the pixel unit, and defines a plurality of first alignment defect areas adjacent to the first photo spacers along the first alignment direction, the first corner and the second corner are two diagonally opposite corners of the pixel unit, the second alignment film has a second alignment direction being perpendicular to the first alignment direction, and defines a plurality of second alignment defect areas adjacent to the second photo spacers along the second alignment direction, and the first and second alignment defect areas are covered by the light-shield film.

9. The liquid crystal panel as claimed in claim 8, wherein a height of the first photo spacers is not equal to a height of the second photo spacers, and a cell gap of the liquid crystal panel is equal to a greater one of the height of the first photo spacers and the height of the second photo spacers.

10. The liquid crystal panel as claimed in claim 8, wherein the light-shield film is provided on the first substrate.

11. The liquid crystal panel as claimed in claim 10, wherein the first substrate further comprises a plurality of gate lines parallel to each other, and a plurality of data lines parallel to each other, the data lines intersecting with the gate lines and being insulated from the gate lines, the plurality of thin film transistors provided in the vicinity of points of intersection of the gate lines and the data lines, the data lines and the gate lines corresponding to the light-shield film.

12. The liquid crystal panel as claimed in claim 11, wherein each thin film transistor comprises a gate electrode connected to a corresponding one of the gate lines, with the source electrode of the thin film transistor connected to a corresponding one of the data lines.

13. A liquid crystal panel comprising:
a first substrate comprising a plurality of thin film transistors, a plurality of pixel electrodes, a plurality of first photo spacers, and a first alignment film formed on the first photo spacers and the plurality of thin film transistors, each first photo spacer being formed on a corresponding thin film transistor and corresponding to a source electrode of the corresponding thin film transistor, drain electrodes or the thin film transistors being connected to corresponding pixel electrodes, each thin film transistor and the corresponding pixel electrode connected to the thin film transistor defining a substantially rectangular pixel unit, and each thin film transistor being located at a first corner of a corresponding pixel unit;
a second substrate parallel to the first substrate, the second substrate comprising a light-shield film, a plurality of second photo spacers corresponding to drain electrodes of the plurality of thin film transistors, and a second alignment film formed on the second photo spacers, the second photo spacers being disposed between the light-shield film and the second alignment film; and
a liquid crystal layer sandwiched between the first substrate and the second substrate;
wherein the thin film transistors and the first and second photo spacers are covered by the light-shield film and do not overlap the plurality of pixel electrodes, the first alignment film has a first alignment direction, and defines a plurality of first alignment defect areas adjacent to the first photo spacers along the first alignment direction, the second alignment film has a second alignment direction being perpendicular to the first alignment direction and extending from a second corner to the first corner of the pixel unit, and defines a plurality of second alignment defect areas adjacent to the second photo spacers along the second alignment direction, the first corner and the second corner are two diagonally opposite corners of the pixel unit, and the first and second alignment defect areas are covered by the light-shield film.

14. The liquid crystal panel as claimed in claim 13, wherein the light-shield film is grid-shaped, thereby defining a plurality of display areas corresponding to the plurality of pixel electrodes.

15. The liquid crystal panel as claimed in claim 13, wherein a height of the first photo spacers is not equal to a height of the second photo spacers, and a cell gap of the liquid crystal panel is equal to the greater of the height of the first photo spacers and the height of the second photo spacers.

16. The liquid crystal panel as claimed in claim 15, wherein the first substrate composes a plurality of gate lines parallel to each other, and a plurality of data lines parallel to each other, the data lines intersecting with the gate lines and being insulated from the gate lines, the plurality of thin film transistors being provided in the vicinity of points of intersection of the gate lines and the data lines, and the data lines and the gate lines being covered by the light-shield film.

17. The liquid crystal panel as claimed in claim 16, wherein gate electrodes of the thin film transistors are connected to the gate lines, and the source electrodes of the thin film transistors are connected to the data lines.

* * * * *